(12) United States Patent
Funayose et al.

(10) Patent No.: US 6,894,599 B2
(45) Date of Patent: May 17, 2005

(54) METHOD FOR RELEASING SECRET NUMBER OF THEFT PREVENTION FUNCTION IN TRANSPORTATION MEANS

(75) Inventors: Yusuke Funayose, Saitama (JP); Toru Hasegawa, Saitama (JP); Tomohiko Yashiro, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 388 days.

(21) Appl. No.: 10/238,579

(22) Filed: Sep. 11, 2002

(65) Prior Publication Data

US 2003/0062987 A1 Apr. 3, 2003

(30) Foreign Application Priority Data

Sep. 18, 2001 (JP) ........................................ 2001-283617

(51) Int. Cl.$^7$ .......................... H04Q 1/00; B60R 25/10; B60R 25/00; B60R 25/04; B60L 3/00
(52) U.S. Cl. .................................. 340/5.54; 340/426.11; 307/9.1; 307/10.2; 307/10.3; 307/10.4
(58) Field of Search ................................ 340/5.54, 5.51, 340/5.2, 425.5, 426.11; 307/9.1, 10.2, 10.3, 10.4

(56) References Cited

U.S. PATENT DOCUMENTS

| | | | |
|---|---|---|---|
| 4,888,575 A | * | 12/1989 | De Vaulx ................. 340/5.72 |
| 5,431,244 A | * | 7/1995 | Possobom ............... 340/426.11 |
| 5,639,698 A | | 6/1997 | Yamazaki et al. |
| 6,525,643 B1 | | 2/2003 | Okada et al. |
| 6,737,956 B1 | * | 5/2004 | Kimura ..................... 340/5.54 |

FOREIGN PATENT DOCUMENTS

JP 9-169298 A 6/1997

* cited by examiner

Primary Examiner—Brian Zimmerman
Assistant Examiner—Clara Yang
(74) Attorney, Agent, or Firm—Birch, Stewart, Kolasch & Birch, LLP

(57) ABSTRACT

A method is provided for releasing a secret number of a theft prevention function in jet propulsion boat, which is equipped with the theft prevention function. The theft preventing function is capable of turning a power source ON by an occupant inputting the secret number. In the method, at least one of a plurality of harness connected to the theft prevention function is removed to input, a predetermined number (number for release), whereby the secret number is rendered capable of being released. Since the secret number is rendered capable of being released by removing at least one of a plurality of harnesses connected to the theft prevention function, and by inputting a predetermined number, it is possible to make forgetting the secret number and maintenance of the theft prevention function compatible.

16 Claims, 16 Drawing Sheets

FIG. 9(a)
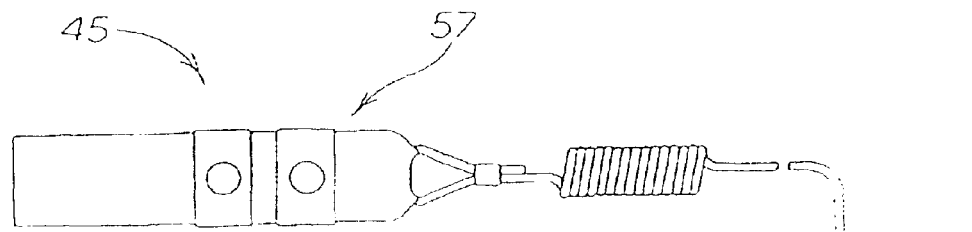
FIG. 9(b)
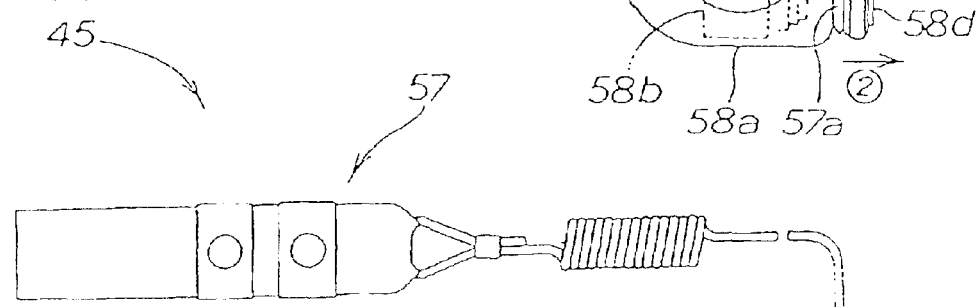
FIG. 9(c)
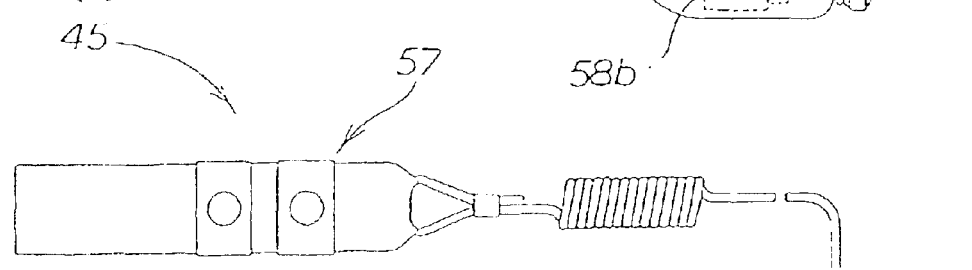
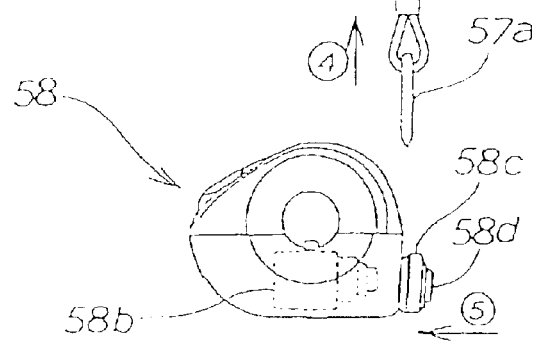

METHOD FOR RELEASING SECRET NUMBER OF THEFT PREVENTION FUNCTION IN TRANSPORTATION MEANS

CROSS-REFERENCE TO RELATED APPLICATIONS

This application claims priority under 35 U.S.C. § 119 on Application No. 2001-283617, filed in Japan on Sep. 18, 2001, the entirety of which is hereby incorporated by reference.

1. Field of the Invention

The present invention relates to a method for releasing a secret number of a theft prevention function in a transportation means, equipped with the theft prevention function capable of turning ON a power source by an occupant inputting the secret number. In this respect, the transportation means refers to general transportation means including ships, airplanes, railroads or vehicles and the like.

2. Description of Background Art

A small boat, which is capable of starting an engine by inputting a secret number is known, for example, from Japanese Published Unexamined Application No. 9-169298 entitled "STARTING SYSTEM FOR SMALL SHIP".

According to FIGS. 2 and 3 of the above document, a gauge panel 6 is provided with control means E. The gauge panel 6 is provided with a meter 61 such as a speedometer and a tachometer. A stop watch and a display unit 620 are provided for displaying navigation time and the like. A power source is connected to the gauge panel 6 through an ON/OFF switch 66 and to a starter motor 68 through a relay 67. By inputting a secret number, the starter motor 68 is caused to rotate. Operating means 62 is provided for the gauge panel 6 for starting an engine 5. A mode change-over button 610 is provided on the gauge panel 6 for switching the display unit.

In the above-described starting system in a small ship, the engine 5 is started by inputting a secret number in the operating means 62. When, for example, the operator or owner has forgotten the secret number, large scale repair such as replacing the entire starting system may be required. On the other hand, when the secret number can be simply reset, the theft prevention function cannot be maintained.

Thus, a method for releasing a secret number of a theft prevention function in a transportation means, which is capable of maintaining a sufficient theft prevention function and not requiring large scale repair is desirable.

SUMMARY OF THE INVENTION

In other words, it is an object of the present invention to provide a method for releasing a secret number of theft prevention function in transportation means, which is capable of maintaining a sufficient theft prevention function and does not require large scale repair.

In order to achieve the above-described object, according to a first aspect of the present invention, a method for releasing a secret number of theft prevention function in a transportation means has been provided. Transportation means is equipped with a theft prevention function, which is capable of turning ON a power source by an occupant inputting a secret number. At least one of a plurality of harnesses connected to the theft prevention function can be removed to input a predetermined number, whereby the secret number is rendered capable of being released.

When an operator or owner has forgotten the secret number, the entire theft prevention function may have to be replaced. Accordingly, the repair expenses can be enormously high. On the other hand, when the secret number can be simply reset, the theft prevention function cannot be maintained.

In the present invention, since the secret number is rendered capable of being released by removing at least one of a plurality of harnesses connected to the theft prevention function, and by inputting a predetermined number, it is possible to make forgetting the secret number and maintenance of the theft prevention function compatible with each other.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 9(*a*) to 9(*c*) are operating views showing the main switch with a lanyard switch for the transportation means in which the method for releasing a secret number of a theft prevention function according to the present invention has been adopted;

DETAILED DESCRIPTION OF THE PREFERRED EMBODIMENTS

Figure 1:
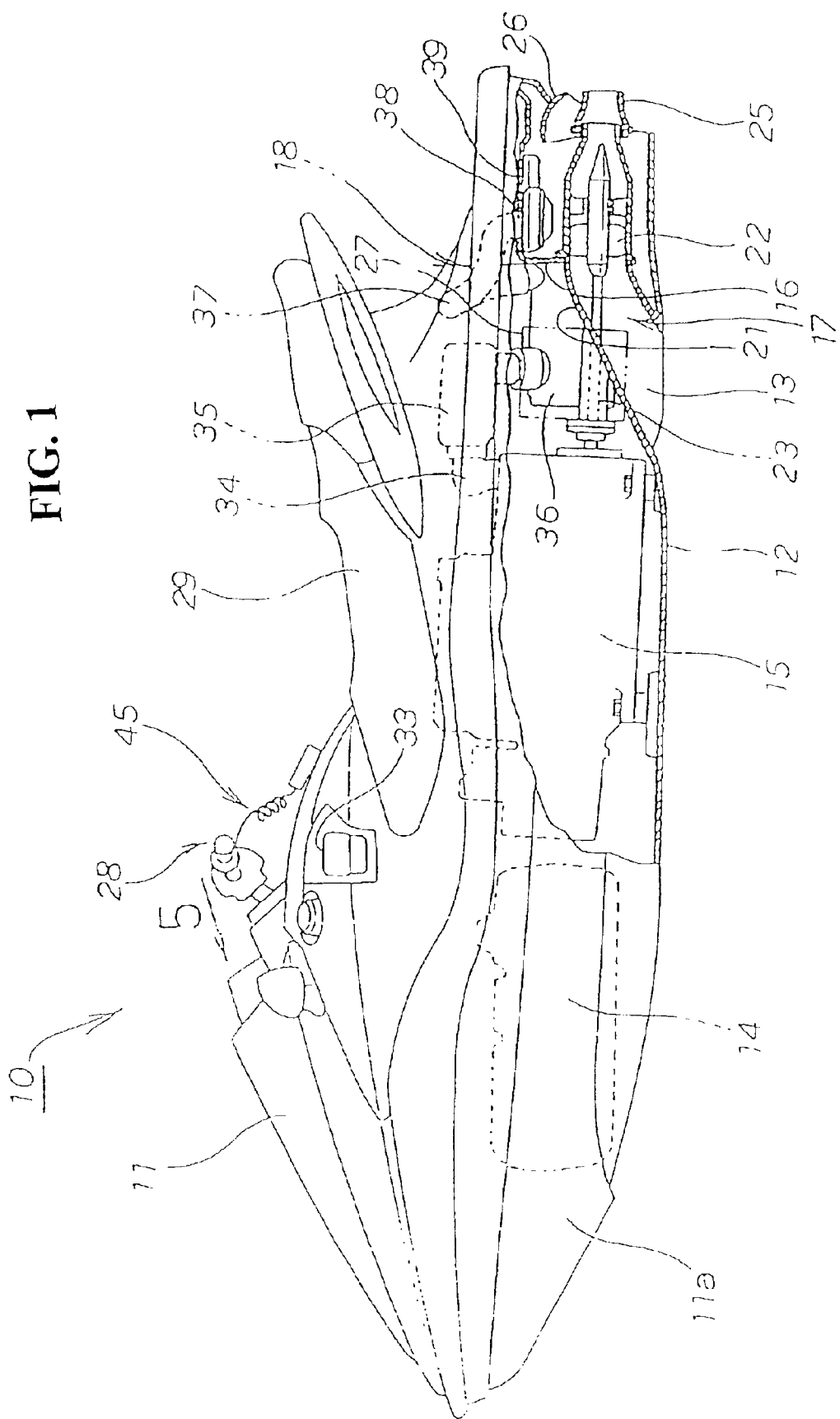
FIG. 1 is a side view showing transportation means in which a method for releasing a secret number of a theft prevention function according to the present invention has been adopted.

The present invention will now be described with reference to the accompanying drawings. It should be noted that the drawings should be viewed in accordance with the orientation of the reference numerals.

FIG. 1 is a side view showing transportation means in which a method for releasing a secret number of a theft prevention function according to the present invention has been adopted. A jet propulsion boat 10 is an example of the transportation means according to the present invention. The jet propulsion boat 10 includes a fuel tank 14 mounted to a front part 11a of a boat hull 11. An engine 15 is provided behind the fuel tank 14. A pump chamber 16 provided behind the engine 15. A jet propeller 17 is provided in the pump chamber 16. An exhaust unit 18 includes a suction side mounted to the engine 15, and an exhaust side mounted to the pump chamber 16. A steering handle 28 is mounted above the fuel tank 14; and a seat 29 mounted behind this steering 28.

The jet propeller 17 has a housing 21 extending backward from an opening 13 in a hull bottom 12, and is constructed such that an impeller 22 is rotatably mounted within the housing 21. The impeller 22 is coupled to a driving shaft 23 of the engine 15.

In the jet propeller 17, the engine 15 is driven to rotate the impeller 22, whereby water sucked through the opening 13 in the hull bottom 12 can be injected backward of the boat hull 11 through a steering pipe 25, which acts as a nozzle opening at a rear end of the housing 21.

The steering pipe 25 is a member mounted to the rear end of the housing 21 so as to be able to freely swing in the lateral direction. The steering pipe 25 acts as a nozzle for steering which controls the steering direction of the boat hull 11 by swinging in the lateral direction through operation of the steering handle 28.

In the jet propulsion boat 10, fuel is supplied to the engine 15 from the fuel tank 14 to drive the engine 15. A driving force of the engine 15 is transmitted to the impeller 22 through the driving shaft 23 to rotate the impeller 22, whereby water is sucked from the opening 13 in the hull bottom 12 and the water thus sucked can be injected through the steering pipe 25 through the rear end of the housing 21 for propelling.

Also, as will be described below, the jet propulsion boat 10 is a boat hull equipped with a control unit in order to precisely control an amount of the jet water stream or a duration during which the jet water stream can be injected. Furthermore, the jet propulsion boat 10 is also a boat hull capable of being switched into a limited operation mode in which the engine output can be controlled so as not to exceed a predetermined output.

In FIG. 1, reference numeral 26 designates a reverse bucket, which when reversing the boat hull, is moved over the steering pipe 25 to flow the jet water stream forward obliquely downward. Reference numeral 33 is an operating knob for operating the reverse bucket 26. Reference numeral 34 is an exhaust pipe. Reference numeral 35 is an exhaust body. Reference numeral 27 is a battery which is a power source for the boat hull 11. Reference numeral 36 is a water muffler. Reference numeral 37 is a water lock pipe. Reference numeral 38 is a tail pipe. Reference numeral 39 is a resonator. Reference numeral 45 is a main switch with a lanyard switch.

Figure 2:
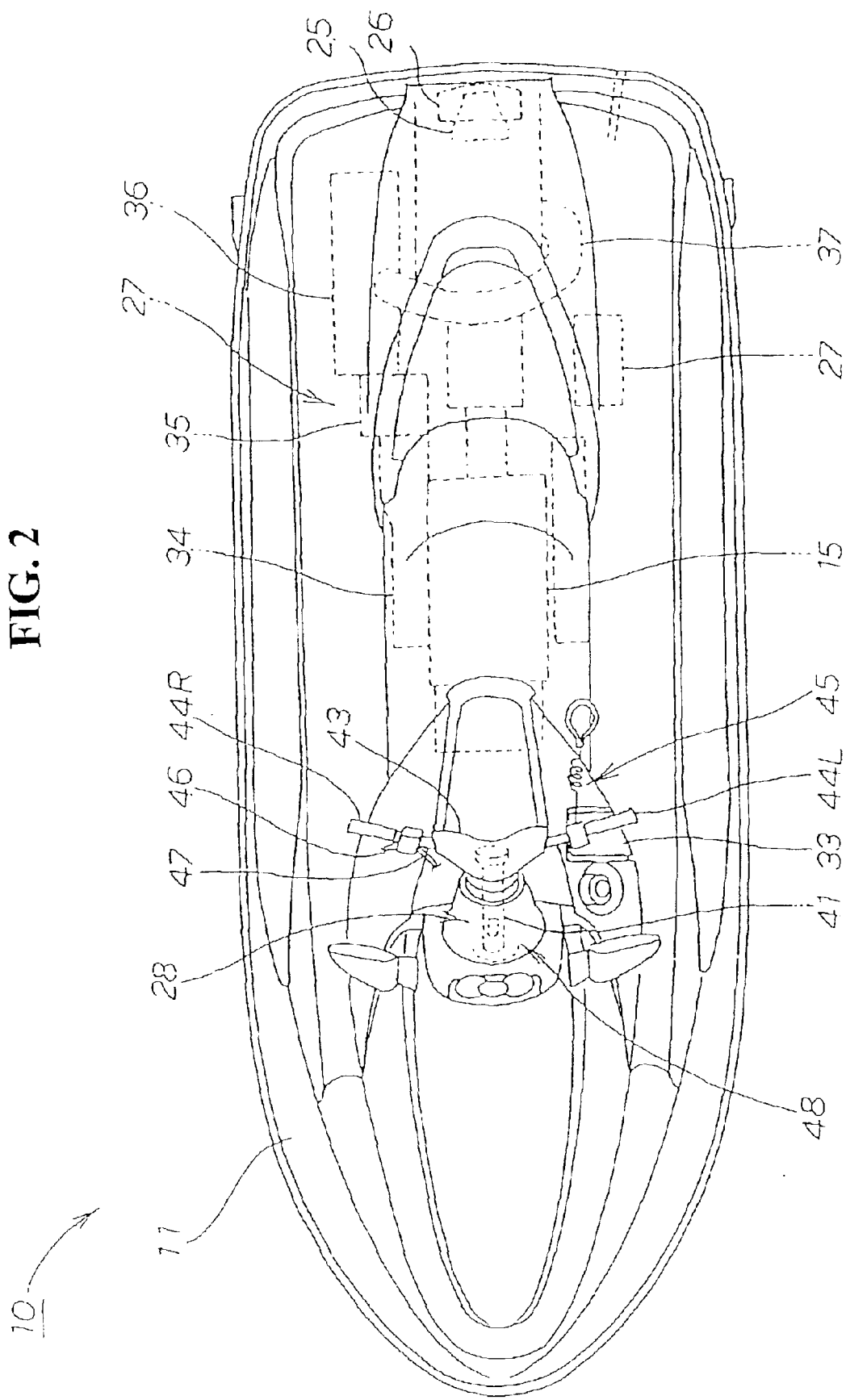
FIG. 2 is a plan view showing transportation means in which a method for releasing a secret number of a theft prevention function according to the present invention has been adopted.

FIG. 2 is a plan view showing transportation means in which a method for releasing a secret number of a theft prevention function according to the present invention has been adopted. The steering handle 28 includes a steering shaft 41 rotatably mounted on the boat hull. A steering wheel bar 43 is mounted to a top end of the steering shaft 41. Right and left steering wheel grips 44L, 44R are mounted onto the left and right end portions of the steering wheel bar 43. A main switch 45 with a lanyard switch is provided at the base of the left steering wheel grip 44L. A throttle lever 46 is mounted on the base of the right steering wheel grip 44R in such a manner as to be able to freely swing. A throttle cable 47 extends to the throttle from the throttle lever 46. A steering detection mechanism 48 is provided at the lower end of the steering shaft 41.

Figure 3:
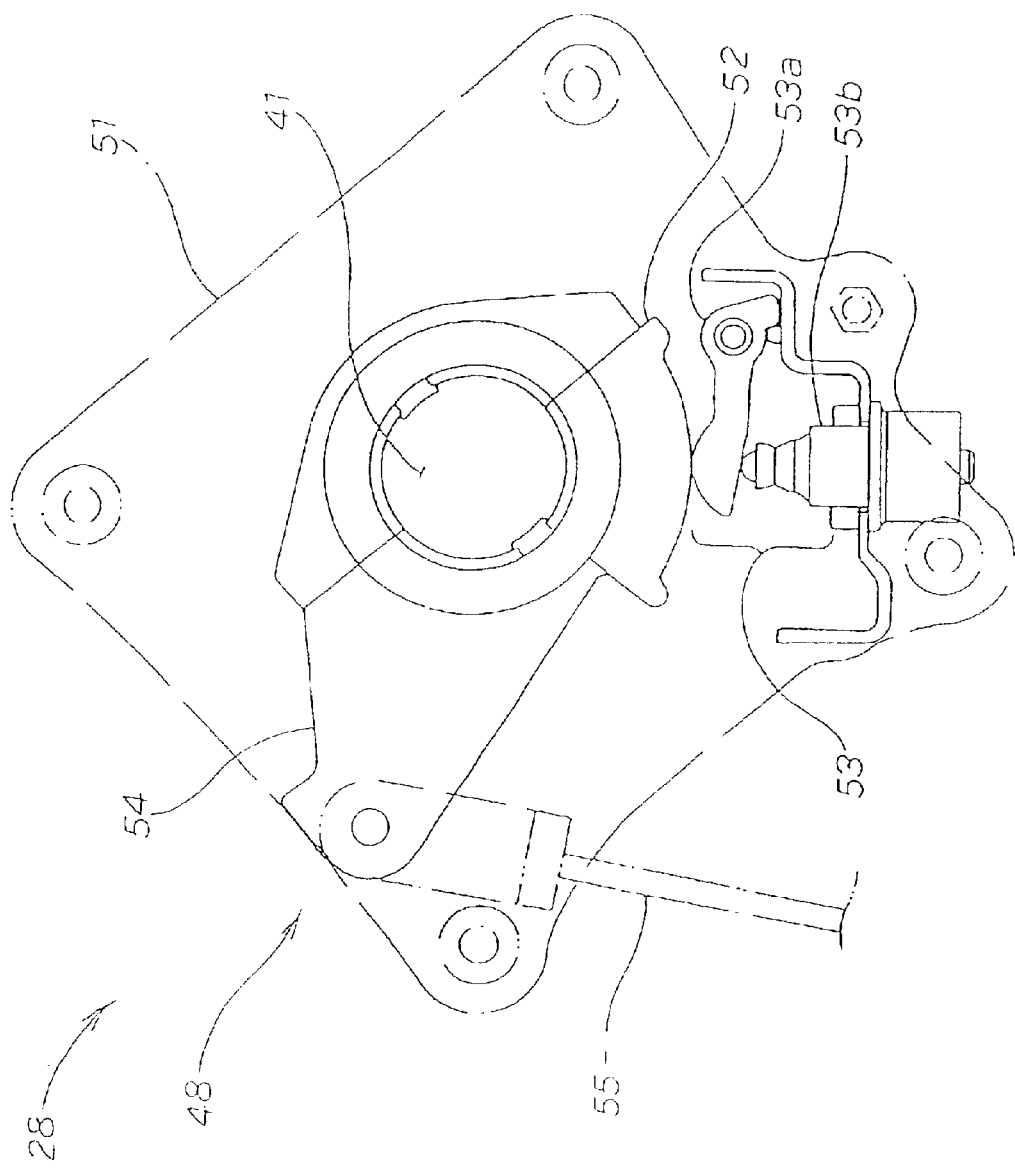
FIG. 3 is a plan view showing a steering mechanism in the transportation means in which the method for releasing a secret number of a theft prevention function according to the present invention has been adopted.

FIG. 3 is a plan view showing a steering mechanism for transportation means in which a method for releasing a secret number of a theft prevention function according to the present invention has been adopted. The steering detection mechanism 48 includes a bracket 51 mounted on the boat hull 11 (See FIG. 1). A switch cam 52 is mounted to the lower end of the steering shaft 41. A steering switch 53 is provided for turning ON/OFF through the use of the switch cam 52. A cam plate 54 is mounted to the lower end of the steering shaft 41. In this respect, reference numeral 55 designates a driving link for driving the steering pipe 25 (See FIG. 1) by being rotatably mounted to the end portion of the cam plate 54. Reference numeral 53a is a switch lever for the steering switch 53, and reference numeral 53b is a body portion of the steering switch 53.

Figure 4:
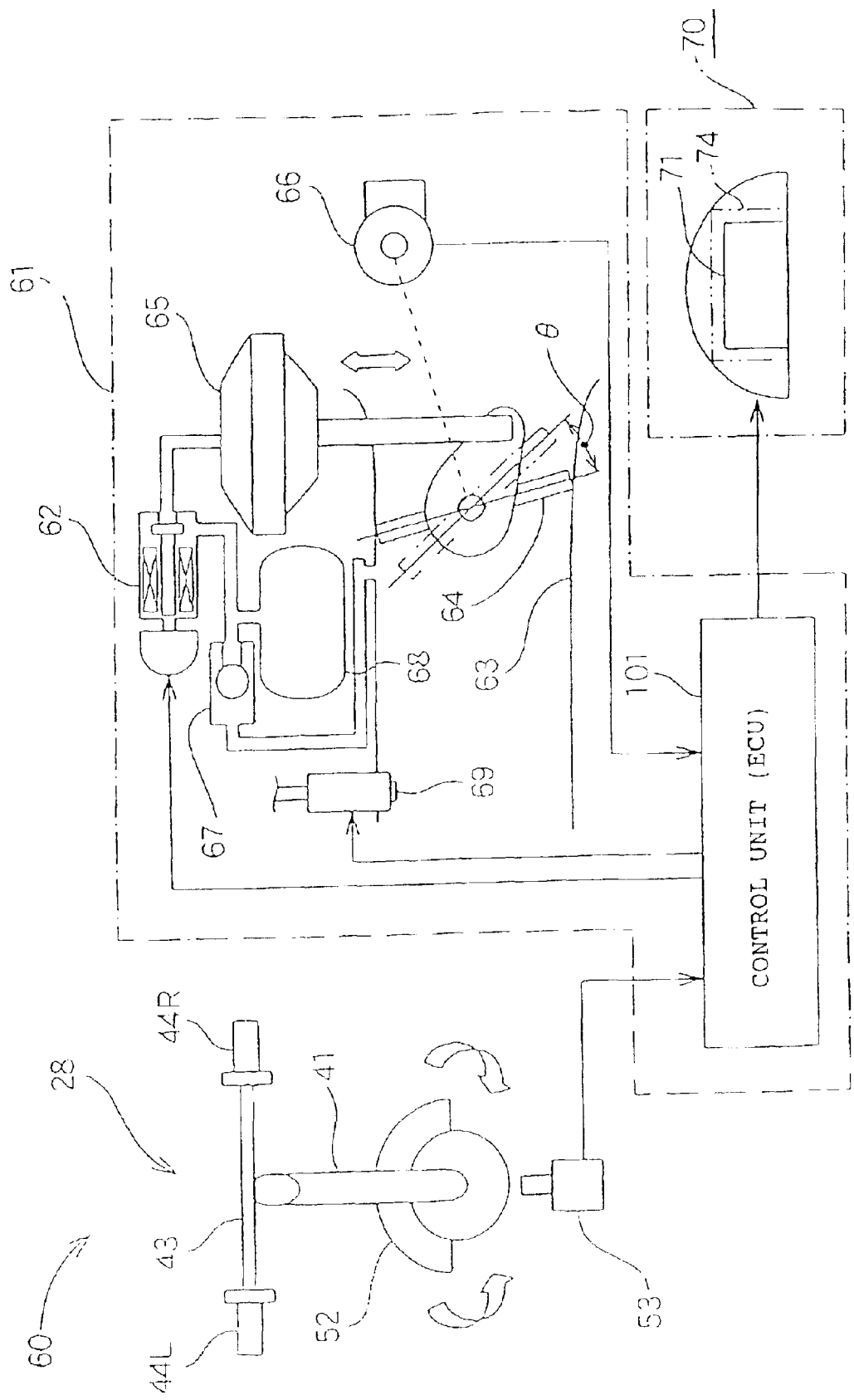
FIG. 4 is a block diagram showing an OTS control device in the transportation means in which the method for releasing a secret number of a theft prevention function according to the present invention has been adopted.

FIG. 4 is a block diagram showing an OTS control device for transportation means in which a method for releasing a secret number of a theft prevention function according to the present invention has been adopted. In this case, OTS is the abbreviated name for an off Throttle Steering System. The OTS is a device in which even when the throttle 34 has been returned, a predetermined jet water stream is rendered capable of being maintained for a predetermined period of time.

An OTS control device 60 for a small boat is a system, which includes the steering handle 28 for steering the boat hull 11 (See FIG. 1). A fuel injection system 61 is provided for supplying fuel to the engine 15 (See FIG. 1). A control unit (ECU) 101 is provided for controlling the boat hull 11. A display device 70 equipped with a display control unit 74 as a control unit, is provided for displaying a state of the boat hull 11. This system is a system for raising the number of revolutions of the engine 15 to a predetermined number of revolutions irrespective of the throttle 64 when the engine 15 rotates at a predetermined number of revolutions or higher for a predetermined time period or more, and the throttle 64 is opened at a predetermined opening or more for a predetermined time period or more. In addition, if the throttle 64 is closed and at the same time, the steering wheel 28 is turned to the left or right more than a predetermined angle, the system raises the number of revolutions of the engine 15.

The fuel injection system 61 includes a solenoid 62 for controlling negative pressure on the basis of information from the control unit (ECU) 101. The throttle 64 is provided in an intake air passage 63, for adjusting an amount of an air-fuel mixture to be supplied to the engine 15 (See FIG. 1). A diaphragm 65 is provided between the solenoid 62 and the throttle 64 for adjusting a throttle opening. A throttle position sensor 66 is provided for detecting the throttle opening. A one-way valve 67 is provided between the solenoid 62 and the intake air passage 63, for preventing negative pressure from reverse-flowing, and pressure from entering. A surge tank 68 is provided between the one-way valve 67 and the solenoid 62, for relaxing negative pressure fluctuation. An injector 69 is provided for causing fuel to be in a fine spray state to be supplied to the intake air passage 63. In this figure, θ designates the throttle opening.

Figure 5:
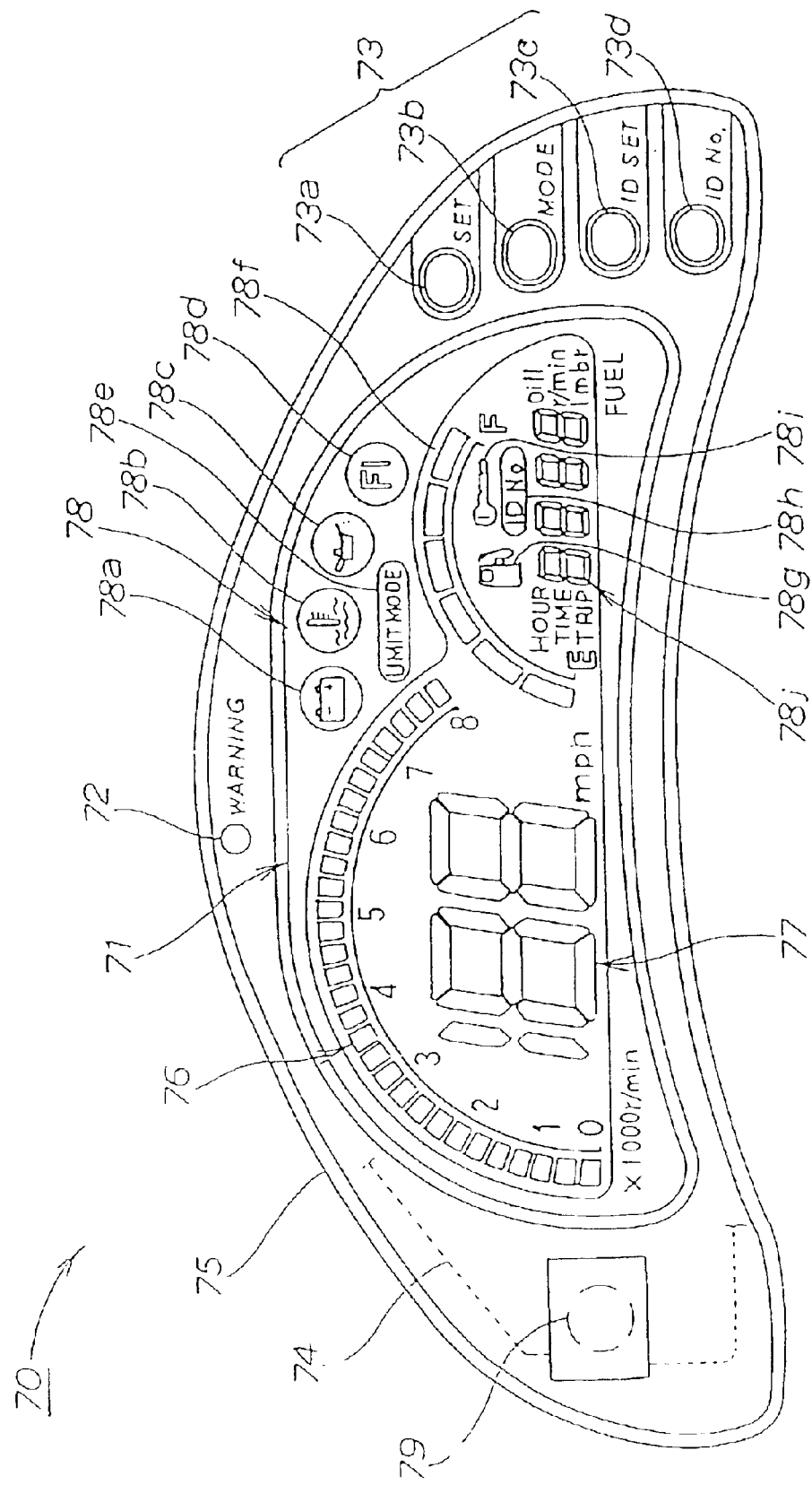
FIG. 5 is a view in the direction of the arrow 5 in FIG. 1.

FIG. 5 is view in the direction of the arrow 5 in FIG. 1, and shows a front surface of a display device 70 (hereinafter, "display device 70") of transportation means according to the present invention. The display device 70 includes a liquid crystal device 71 as a liquid crystal display unit for displaying operation information. A warning lamp 72 is provided for lighting or blinking when a various warning is needed. An operating switch 73 is provided for performing a switching operation or an input operation. A display control unit 74 is provided for driving the liquid crystal device 71 and the warning lamp 72 and controlling the boat hull 11. A housing 75 is provided for collectively covering the liquid crystal device 71, warning lamp 72 and display control unit 74. A buzzer 79 is provided for giving a warning sound when lighting or blinking the warning lamp 72.

The liquid crystal device 71 is obtained by forming a tachometer 76 for indicating a number of revolutions of the engine 15 (See FIG. 1), a speed meter 77 for indicating the boat speed, and a multifunctional display unit 78 for displaying operation information and various warnings.

The multifunctional display unit 78 includes a charging mark 78a for blinking when the battery 27 (See FIG. 1) is lower than predetermined voltage. A water temperature warning mark 78b is provided for blinking when cooling water temperature exceeds a predetermined temperature. An oil warning mark 78c is provided for blinking when an amount of engine oil is lower than a predetermine amount, or when engine oil pressure is lower than a predetermined value. A fuel injection system warning mark 78d (hereinafter, will be abbreviated as "FI warning mark 78d") is provided for blinking when abnormal conditions are encountered with the fuel injection system 61 (See FIG. 3). A limit mode indicating mark 78e is provided as an indicating lamp indicating that a limited operation mode, which limits the engine output so as not to exceed the predetermined output has been set. A remaining quantity indicator 78f is provided for indicating the remaining fuel quantity. A fuel replenish warning mark 78g is provided for urging to replenish fuel when the remaining fuel quantity is small. An ID number mark 78h is provided for blinking when an ID (Identification) number as a secret number for theft prevention is set and is locked. A key mark 78i is provided for lighting when the theft-prevention function has been released. A selector display unit 78j is provided for displaying after being switched to time indication, hours underway indication, the number of engine revolutions, navigation distance indication or cumulative hours underway indication.

In other words, the jet propulsion boat 10 (See FIG. 1) is also a propulsion boat equipped with a theft-prevention function, the power source of which can be turned ON or OFF by inputting the ID number.

The operating switch 73 includes a set switch 73a to be used when setting time and the like. The mode switch 73b is used when switching the selector display unit or when setting the limited operation mode. The ID set switch 73c and the ID number switch 73d are used when encoding with an ID number for determination.

Figure 6:
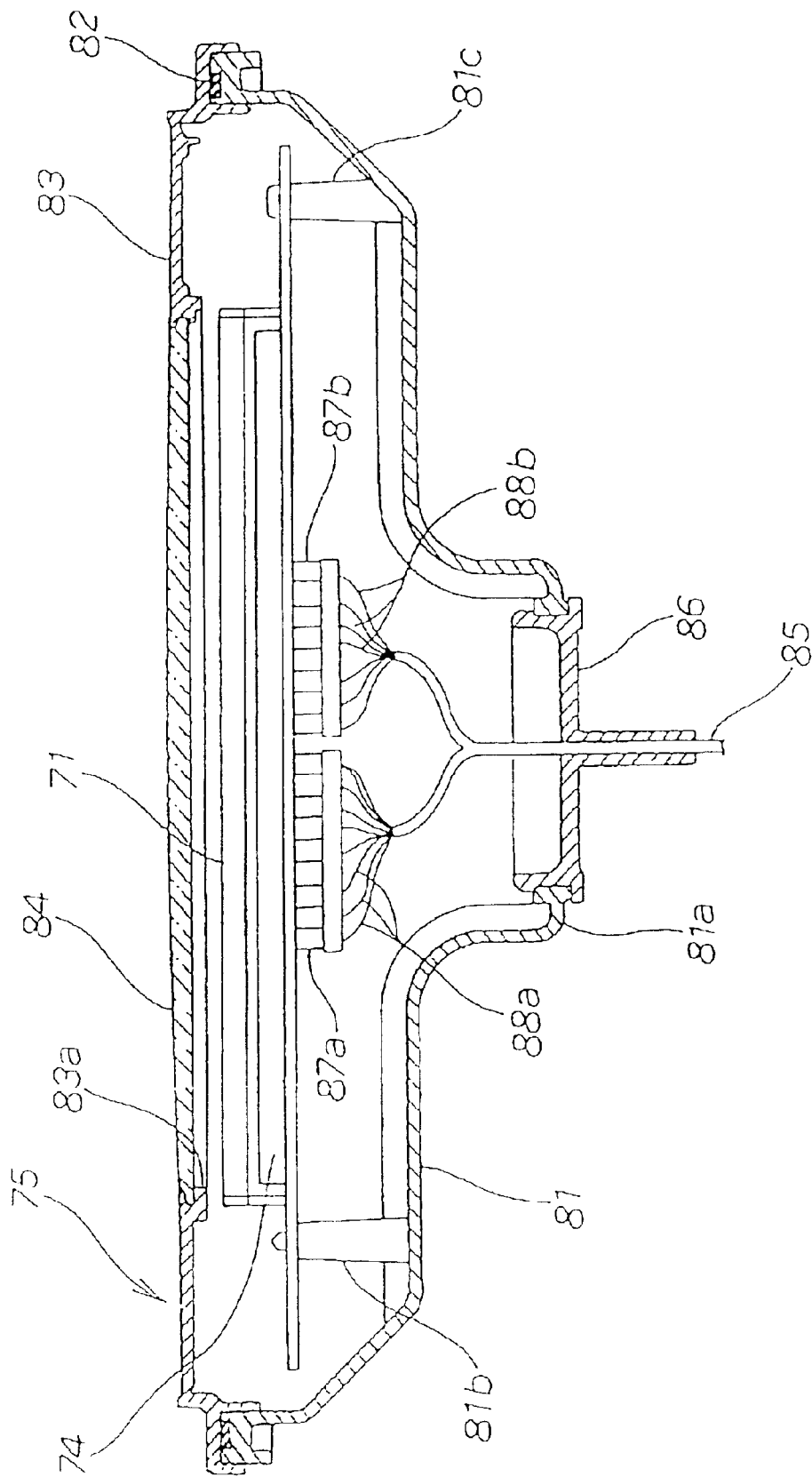
FIG. 6 is a plan cross-sectional view showing a display device of the transportation means in which the method for releasing a secret number of a theft prevention function according to the present invention has been adopted.

FIG. 6 is a plan cross-sectional view showing a display device for transportation means in which a method for releasing a secret number of a theft prevention function according to the present invention has been adopted. A housing 75 includes a lower case 81 for mounting a display control unit 74. An upper case 83 is mounted to the lower case 81 through a packing 82. A display window 84 is mounted onto an opening 83a of the upper case 83. A bush 86 is provided to draw out a harness 85 obtained by tying up in a bundle from the bottom 81a of the lower case 81.

Reference numeral 81b designates a boss for supporting the display control unit 74 by standing it in the lower case 81. Reference numeral 81c is a set boss for fastening the display control unit 74 by standing it in the lower case 81. Reference numerals 87a and 87b are connectors connected to the display control unit 74. Reference numerals 88a and 88b are a plurality of harnesses extending from the display control unit 74.

Figure 7:
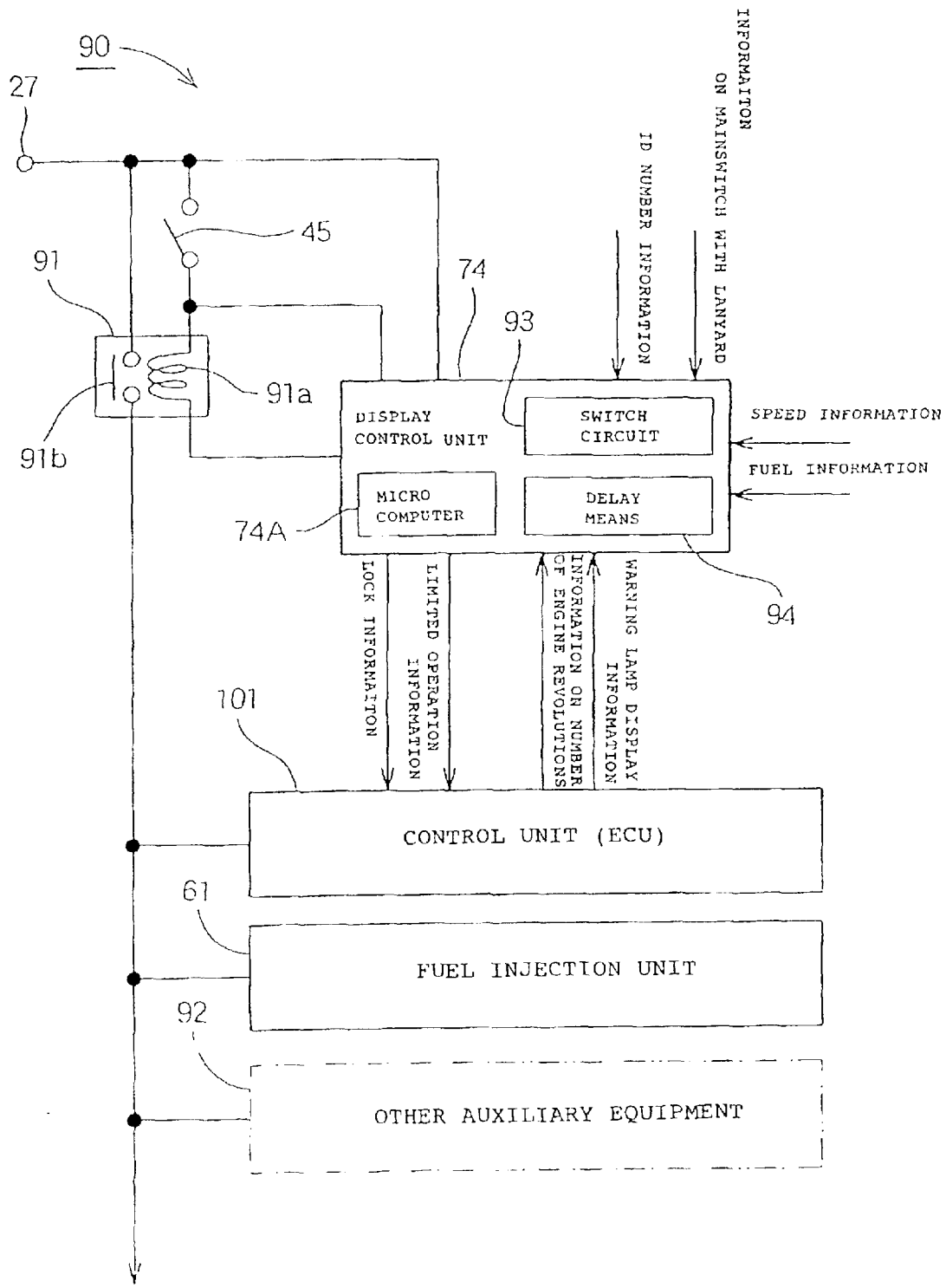
FIG. 7 is a block diagram showing a power source system in the transportation means in which the method for releasing a secret number of a theft prevention function according to the present invention has been adopted.

FIG. 7 is a block diagram showing a power source system for transportation means in which a method for releasing a secret number of a theft prevention function according to the present invention has been adopted. The power source system 90 includes a main switch 45 with a lanyard switch connected to a battery 27 in parallel. A main relay 91 is provided for turning ON/OFF the battery 27 for supplying to the fuel injection system 61 and other accessories 92 (fuel pump to be described later) by connecting a coil portion 91a to the main switch 45 in series and connecting a switch portion 91b to the battery 27 in series. The display control unit 74 connects to the main switch 45 in parallel in order to control the main relay 91. The control unit (ECU) 101 is provided for controlling the engine 15 (See FIG. 1) having the fuel injection system 61 and the like.

The control unit (ECU) 101 is a portion which controls the engine 15 and controls the jet propulsion boat 10 (See FIG. 1) which controls the fuel injection system 61 and other accessories 92.

The display control unit 74 is equipped with a microcomputer 74A which forms the heart of the system. A switch circuit 93 turns ON/OFF the power source of the display control unit 74 itself by inputting information of the main switch 45 with lanyard switch and a predetermined ID number. Delay means 94 is provided for delaying the operation of the switch circuit 93 for a predetermined time period. The delay means 94 inputs ID information for theft prevention, information of the main switch with lanyard switch, speed information of the boat hull, fuel information for displaying the remaining fuel quantity, engine number of revolutions information, and warning lamp display information and the like for lighting the multifunctional function display unit 78 shown in FIG. 5 and the warning lamp 72, and outputs limited operation information when the fuel injection system 61 (See FIG. 4) is controlled for control operation, and lock information which has turned OFF the main relay 91, and the like. In this respect, a reference numeral 92 designates other accessories.

In other words, a power source system for a small boat supplies a power source to accessories including the fuel injection system 61, and the like, and is equipped with a control unit for controlling the engine. The small boat is equipped with the main switch 45 with a lanyard switch capable of turning OFF the power source in an emergency by connecting to an occupant through a wire. The power source system 90 is equipped with a main relay 91 for turning ON/OFF the power source to be supplied to the accessories. Control units (display control unit 74) are connected to the main switch 45 in parallel in order to control the main relay 91, to supervise the ON/OFF state of the main switch 45, through the use of the control unit (display control unit 74) and to ON/OFF control the main relay 91 based on the ON/OFF state.

The structure is arranged such that the main relay 91 is provided in order to turn ON/OFF the power source to be supplied to the accessories including the fuel injection system 61, control units (display control unit 74) are provided in order to control this main relay 91. The control units (display control unit 74) are to be connected to the main switch 45 in parallel. An ON/OFF state of the main switch 45 is supervised by the control unit (display control unit 74) in such a manner that the main relay 91 is turned ON/OFF on the basis of the ON/OFF state. Therefore, ON/OFF of the power source to be supplied to the accessories including the fuel injection system 61 can be collectively controlled. As a result, the power source system 90 can be simplified.

Also, the display control unit 74 outputs to the control unit (ECU) 101 lock information when the main relay 91 is OFF. Therefore, since the control unit (ECU) 101 has the lock information, the engine 15 (See FIG. 1) cannot be started even though the main relay 91 is directly connected.

More specifically, the power source system 90 includes a theft-prevention function in the control unit (display control unit 74). When the control unit (ECU) 101 outputs information to turn OFF the main relay 91 from the control unit (display control unit 74), it is caused to output a stop signal to stop the engine 15 on the basis of this OFF signal.

When information to turn OFF the main relay 91 is outputted from the control unit (display control unit 74), the stop signal to stop the engine 15 is outputted on the basis of this OFF signal, whereby there is no possibility that the engine 15 is started even when, for example, the main relay 91 is directly coupled. Therefore, it is possible to prevent the small boat (jet propulsion boat 10) from being stolen.

Figure 8:
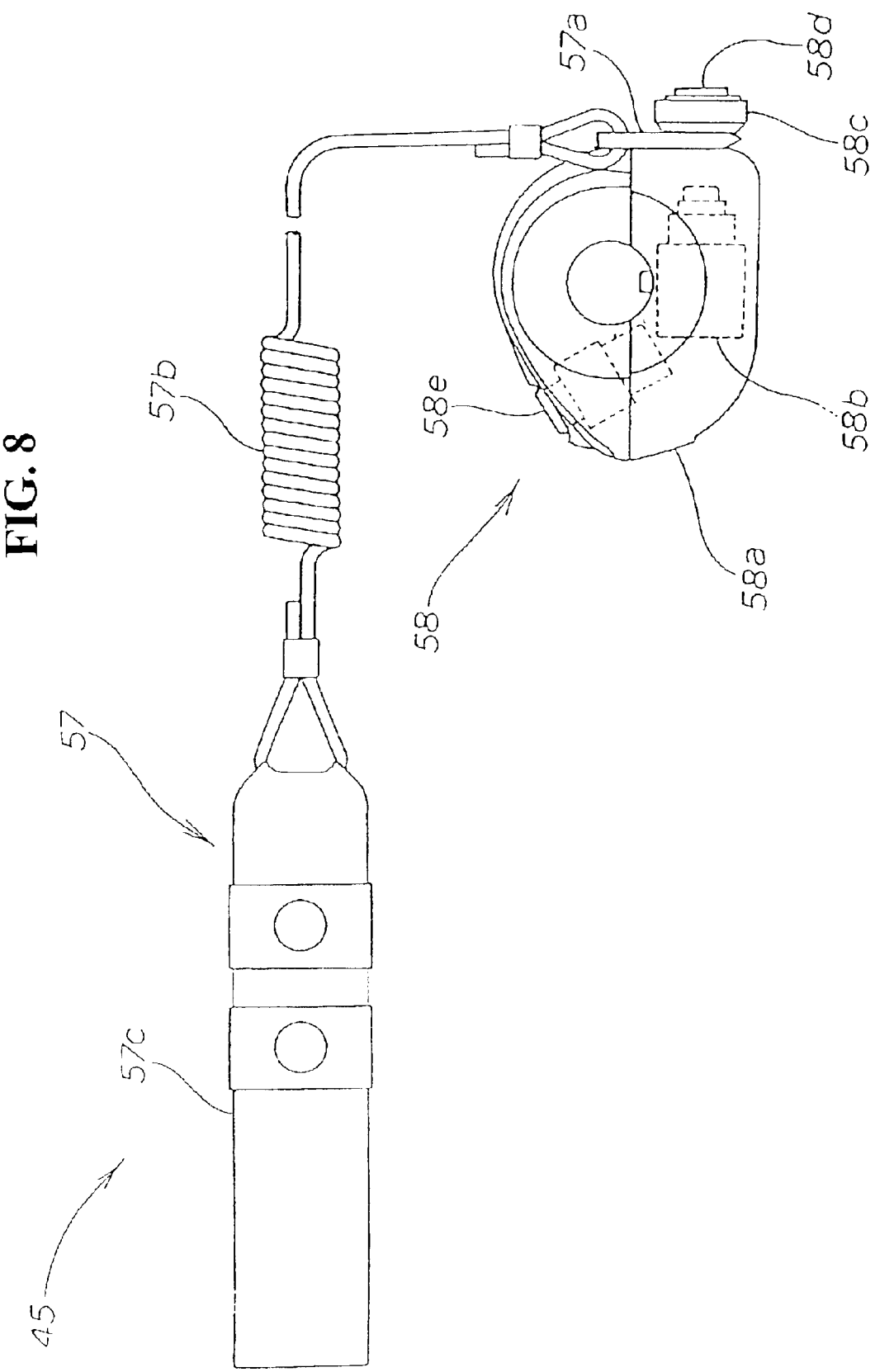
FIG. 8 is a side view showing a main switch with lanyard switch for the transportation means in which the method for releasing a secret number of a theft prevention function according to the present invention has been adopted.

FIG. 8 is a side view showing a main switch with a lanyard switch for transportation means in which a method for releasing a secret number of a theft prevention function according to the present invention has been adopted. The main switch 45 includes a lanyard switch portion (switch operation strap) 57 for being connected to the occupant during navigation and a main switch body portion 58 capable of being turned ON/OFF by the lanyard switch portion 57.

The lanyard switch portion 57 includes a clip portion 57a for turning the power source ON/OFF by sandwiching it in the main switch body portion 58 or removing it. A flexible wire 57b extends from the clip 57a and a hand strap 57c is provided to be worn on the occupant's arm by mounting to the tip end of the wire 57b.

The main switch portion 58 includes a housing 58a for being mounted on the boat hull 11 (See FIG. 1). A switch 58b is housed in this housing 58a. An outer knob 58c is provided for operating the switch 58b. A stop button 58d is provided inside the outer knob 58c and a start switch 58e is provided for starting the engine 15 (See FIG. 1).

This switch turns the switch 58b ON when the outer knob 58c is pulled outward, maintains the switch ON when the clip 57a of the lanyard switch portion 57 is sandwiched, automatically returns to the initial position to turn the switch OFF when the clip 57d comes off, and can turn the power source OFF by pressing the stop button 58d with the clip 57a sandwiched. Hereinafter, the detailed description will be made of an operation of the main switch 45 with the lanyard switch.

FIGS. 9(a) to 9(c) are operating views of the main switch with a lanyard switch for transportation means in which a method for releasing a secret number of a theft prevention function according to the present invention has been adopted.

In FIG. 9(a), the clip 57a of the lanyard switch portion 57 is pressed into between the housing 58a of the main switch body portion 58 and the outer knob 58c as indicated by an arrow ①, whereby the outer knob 58c moves as indicated by an arrow ②, and the switch 58b can be turned ON.

In FIG. 9(b), the stop button 58d is pressed as indicated by an arrow ③ with the lanyard switch portion 57 fitted in the main switch body portion 58, whereby the switch 58b can be turned OFF.

In FIG. 9(c), when the clip 57a of the lanyard switch portion 57 is pulled out between the housing 58a of the main switch body portion 58 and the outer knob 58c as indicated by an arrow ④, the outer knob 58c automatically returns together with the stop button 58d as indicated by an arrow ⑤, and the main switch body portion 58b turns OFF.

Figure 10A:
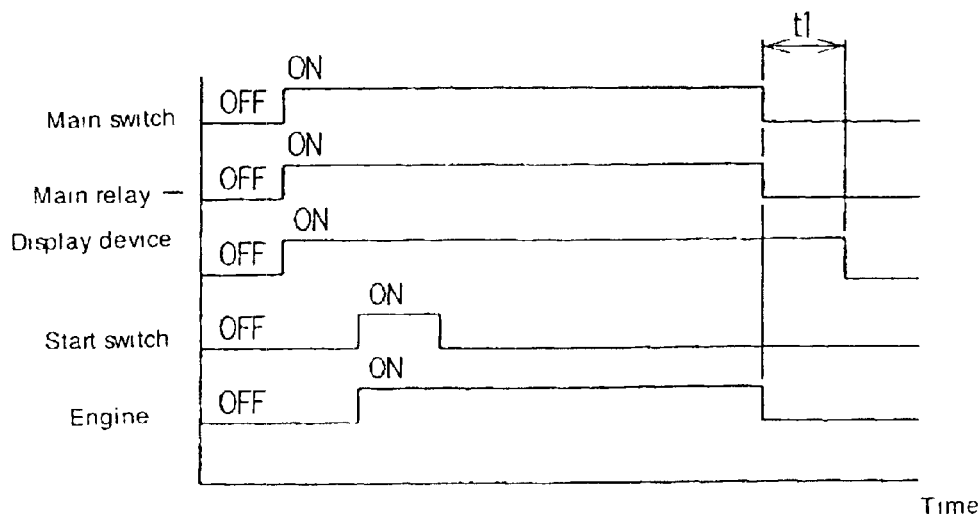
FIGS. 10(*a*) to 10(*c*) are explanatory views for operation of the power source system in the transportation means in which the method for releasing a secret number of a theft prevention function according to the present invention has been adopted.
Figure 10B:
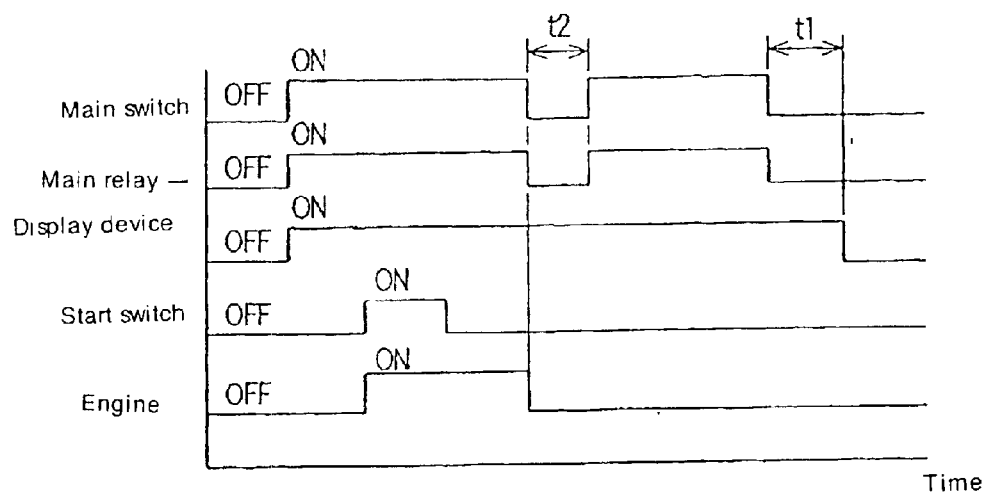
Figure 10C:
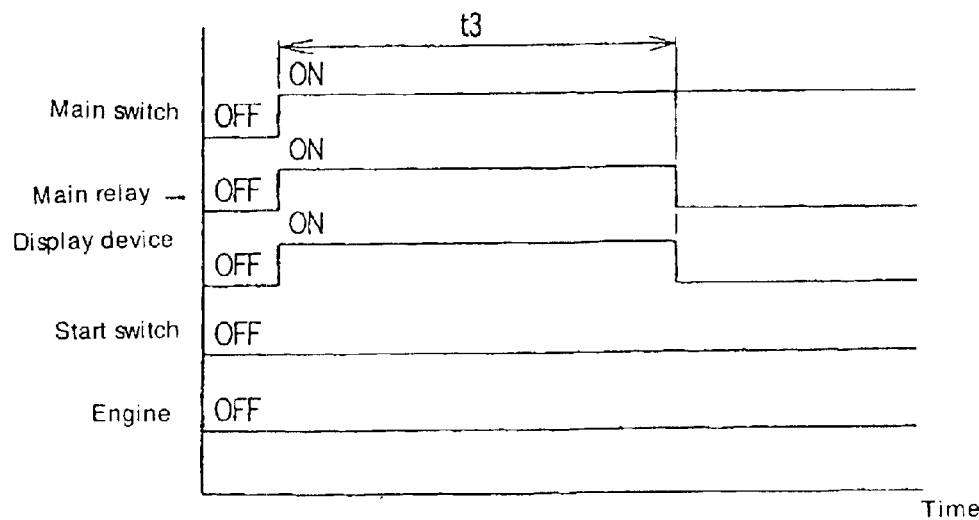

FIGS. 10(a) to 10(c) are operation explanatory views for a power source system for transportation means in which a method for releasing a secret number of a theft prevention function according to the present invention has been adopted. FIGS. 10(a) to 10(c) show a relationship in an operating state between a main relay, the display device, a start switch and the engine (for reference numerals, refer to FIG. 8).

FIG. 10(a) shows an operation relationship when the lanyard switch 57 has been pulled out, i.e., at the termination of navigation or at the time of drainage of water from a pond.

First, as illustrated in FIGS. 9(a) to 9(c), the lanyard switch portion 57 is fitted into the main switch body portion 58, whereby the main switch 45, the main relay 91 (See FIG. 7) and the display device 70 turn ON in synchronism. Pressing the start switch 58e (See FIG. 4) starts the engine 15(See FIG. 1).

Next, when the lanyard switch 57 is pulled out of the main switch body portion 58, the main switch 45, the main relay 91 and the engine 15 turn OFF in synchronism. The display device 70 turns OFF (controlled by delay means 94 equipped for the display control unit 74 as shown in FIG. 7) after a predetermined time period t1. Here, the predetermined time period t1 has been set to 10 seconds.

FIG. 9(b) shows an operation relationship when the engine 15 is stopped without pulling the lanyard switch portion 57 out, i.e., when taking a seat for standby and the like, the stop button 58e is pressed to turn OFF the main switch 45, and the main switch 45 is turned ON within time period t2 (t2<t1). Since the display device 70 has been able to maintain the ON-state during time period t1 since the main switch 45 was turned OFF as shown in FIG. 9(a), only the engine 15 is stopped by the above-described operation. The display device 70 stands by while ON is maintained. The display control unit 74 equipped for the display device 70 enters a trouble inspection mode when the display device 70 is turned ON. Therefore, it takes time to start up the display device 70. Accordingly, the engine 15 is stopped for standing by, and the start switch 58e is pressed so as to be able to navigate immediately.

FIG. 9(c) shows an operation relationship when the lanyard switch 57 is not pulled out, but is left standing. When a predetermined time period t3 has elapsed with the engine 15 turned OFF, and the main switch 45, the main relay 91 and the display device 70 turned ON, the main relay 91 and the display device 70 are automatically caused to turn OFF (controlled by a switch circuit 93 equipped for the display control unit 74 shown in FIG. 7) through the use of the display control unit 74 so as to restrain unnecessary power consumption of the battery 27(See FIG. 1).

When the main switch 45 shifts from the ON-state to an OFF-state, the power source system 90 (See FIG. 4) may cause the main relay 91 to be instantaneously switched from ON to OFF. The control unit (display control unit 74) maintains the ON-state in the OFF-state of the main switch 45 during a predetermined time period.

For example, when starting up the power source, the control unit often causes the display device and the accessories to be subjected to fault diagnosis and the like. Therefore, when the power source for the control unit is carelessly dropped, it takes time to start up the control unit.

Thus, in the OFF-state of the main switch during a predetermined time period, the control unit maintains the ON-state, whereby the main switch 45 (See FIG. 4) is switched to the OFF-state, the main relay 91 is instantaneously switched to OFF, and the supply of power source to the accessories including the fuel injection system 61 and the like is stopped to temporarily stop the jet propulsion boat 10 (See FIG. 1). Since in this temporarily stopped state, the control unit (display control unit 74) can maintain the started-up state, the jet propulsion boat 10 can shift from the temporarily stopped state to a navigateable state in a short time. As a result, the convenience of the jet propulsion boat 10 can be improved.

Figure 11:
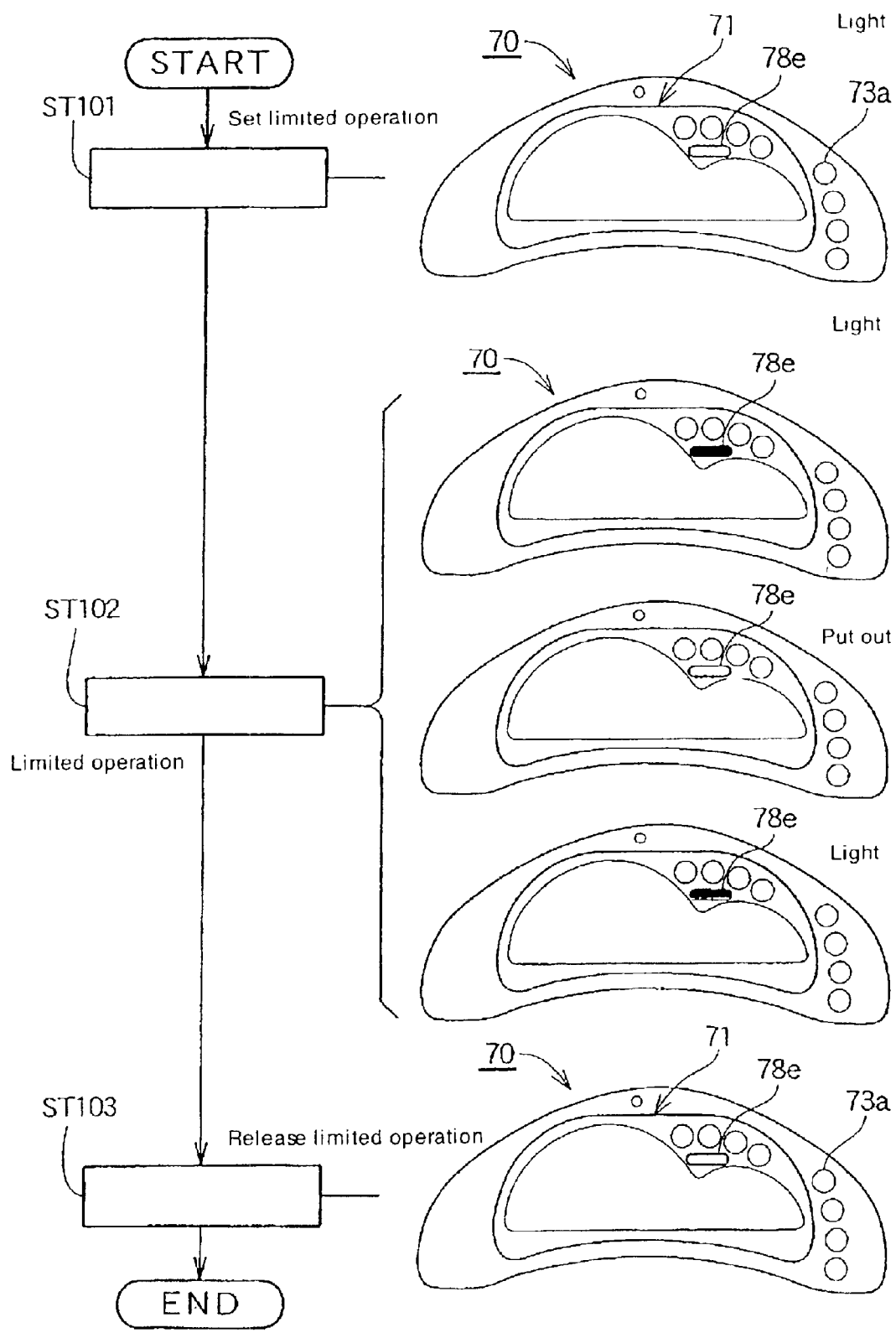
FIG. 11 is a flow chart for setting a limited operation in the transportation means in which the method for releasing a secret number of a theft prevention function according to the present invention has been adopted.

FIG. 11 is a flow chart showing a limited operation setting for transportation means in which a method for releasing a secret number of a theft prevention function according to the present invention has been adopted. In this respect, STxxx designates a step No.

ST101: Set to a limited operation mode in which the output of the engine 15 (See FIG. 1) is limited to a low output. Specifically, continuously depress a set switch 73a of the display device 70. To continuously depress means to continue depressing the set switch 73a for five or more seconds. In this respect, the set switch 73a is a functional setting switch for the present time setting and the like.

In other words, by setting to a limited operation, a limit mode display mark 78e is turned on.

ST102: During the limited operation, the limited mode display mark 78e is caused to blink to display that the output of the engine 15 is limited in the limited operation.

ST103: Release the limited operation mode. Specifically, continuously depress the set switch 73a of the display device 70. The limited mode display mark 78e will be turned off.

A small boat (jet propulsion boat 10) is equipped with a display panel (liquid crystal device 71) for displaying operation information and a change-over switch (set switch 73a) capable of switching from a normal operation to a limited operation. In the normal operation, the output of the engine 15 (See FIG. 1) is not limited, while in the limited operation, the output of the engine 15 is limited to a low output. The display device 70 is a display panel (liquid crystal device 71) having a display lamp (limited mode display mark 78e) for lighting when switched to the limited operation.

For example, it is assumed that when a small boat (jet propulsion boat 10), which capable of switching from a normal operation (See FIG. 1) to a limited operation is steered in the limited operation, the throttle 64 (See FIG. 4) has been opened in order to increase the boat speed. At this time, when the operator is not awareness that the small boat is under the limited operation, the operator may believe that the small boat (jet propulsion boat 10) is not working properly. Therefore, a display lamp (limit mode display mark 78e) is provided for displaying that the engine has been switched from the normal operation to the limited operation, whereby convenience can be afforded to the operator.

Also, the display device 70 is a display device having a display lamp (limit mode display mark 78e), which is caused to blink during the limited operation, i.e., when the number of revolutions of the engine 15 reaches a predetermined number of revolutions or more and the output of the engine 15 is limited.

The display lamp (limit mode display mark 78e) is caused to blink during the limited operation, whereby it can strongly provide the impression that the transportation means is in the limited operation mode.

Furthermore, in the display device 70, the change-over switch (set switch 73a) may also serve the dual functional of a change-over switch for the display panel (liquid crystal device 71).

The change-over switch (set switch 73a) serves the dual function of a change-over switch for the display panel (liquid crystal device 71). Therefore, the operation function can be made multifunctional. Therefore, the display device 70 can be miniaturized.

Figure 12:
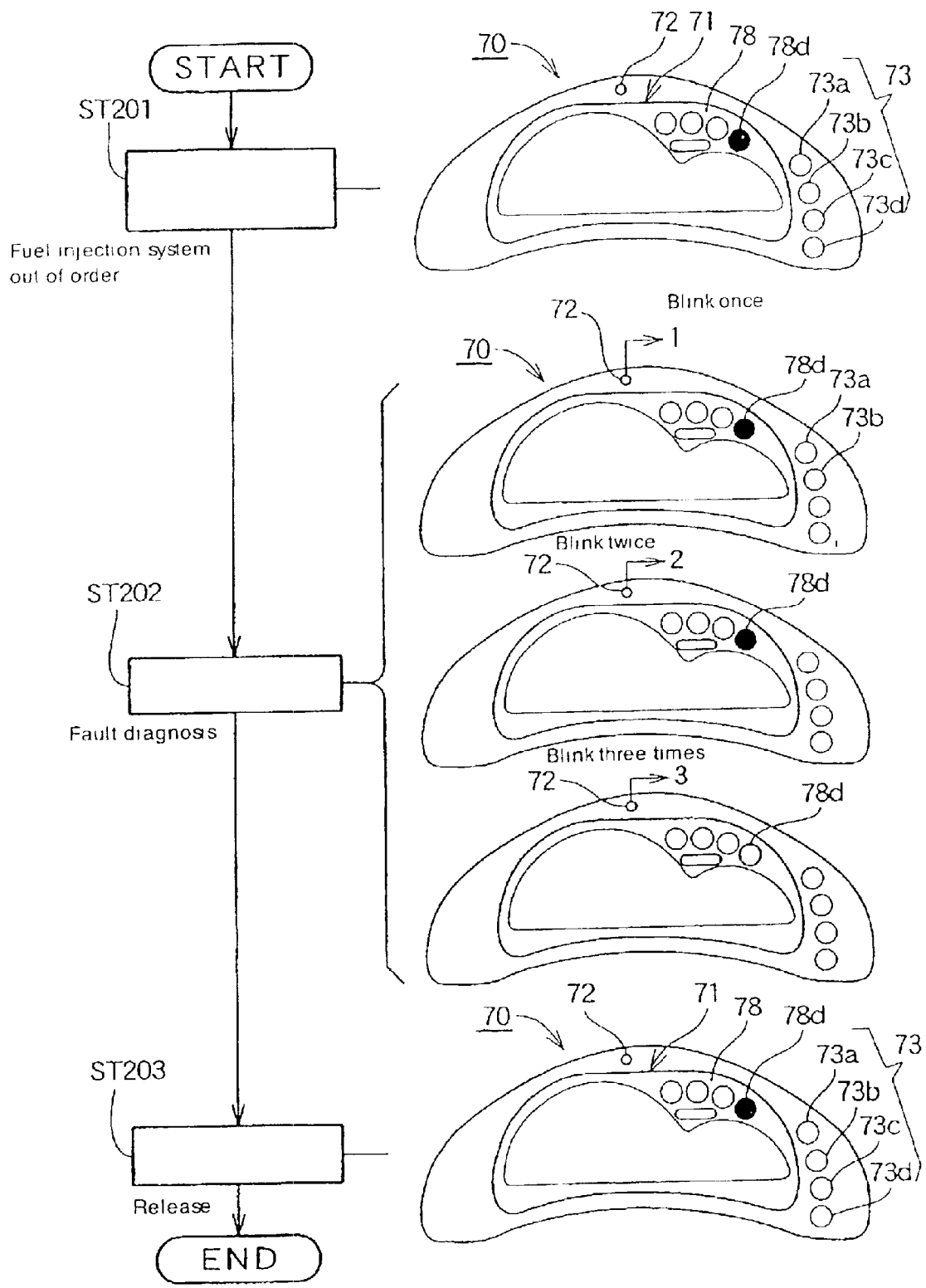
FIG. 12 is a flow chart showing a procedure for fault diagnosis in the transportation means in which the method for releasing a secret number of a theft prevention function according to the present invention has been adopted.

FIG. 12 is a flow chart showing a fault diagnosis procedure for transportation means in which a method for releasing a secret number of a theft prevention function according to the present invention has been adopted. In this respect, STxxx designates a step No.

ST201: Lighting of a fuel injection (FI) warning mark 78d can notify the operator that the fuel injection system 61 (See FIG. 3) is not working properly.

ST202: Perform fault diagnosis. Specifically, continuously depress both the set switch 73a and the mode switch 73b of the display device 70 at the same time.

If the warning lamp 72 blinks once, it shows that the negative pressure in the intake air passage 63 (See FIG. 4) is out of order. When the warning lamp 72 blinks three times, it shows that the fuel pump (not shown) is out of order. When the warning lamp 72 blinks twice, it shows that the throttle link 47 (See FIG. 3) is out of order. Accordingly, these trouble points will be recognized immediately.

ST203: Release the above-described fault diagnosis mode. Specifically, press the mode switch 73b, or it will be automatically released after a lapse of 30 seconds without warning.

A transportation means (jet propulsion boat 10) is equipped with a multifunctional display unit 78, which displays operation information and various warnings. An operating switch 73 is provided for operating the display content of the multifunctional display unit 78. The fuel injection system 61 (See FIG. 4) is provided for injecting fuel into a driving source. In this transportation means, the display device 70 is a display device in which the multifunctional display unit 78 is provided with the warning lamp 72 for warning that the fuel injection system 61 is not working properly. The warning lamp 72 is arranged to light or blink. When the warning lamp 72 lights or blinks, a function to display an abnormal symptom through the use of a blink pattern (such as, for example, blinking once, blinking twice or three times) is provided by operating the operating switch 73.

Generally, the fuel injection system is a device for mixing air with fuel to supply an air-fuel mixture in vaporized form into the engine. When the fuel injection system is not working properly, it is difficult to distinguish whether the intake air system is out of order, the fuel supply system is out of order or other portions are out of order.

Thus, there is provided the warning lamp 72 for warning that the fuel injection system 61 (See FIG. 4) is out of order, which notifies of the abnormality of the fuel injection system 61. Also, this warning lamp 72 is caused to light or blink, whereby it emphasizes that the fuel injection system 61 is out of order. Furthermore, a function for displaying the abnormal symptom through the use of the blink pattern is provided by operating the operating switch 73 when the warning lamp 72 lights or blinks. Accordingly, an immediate measure can be taken to cope with the trouble with the fuel injection system 61.

In other words, since the function for displaying the abnormal symptom through the use of the blink pattern is provided by operating the operating switch 73 when the warning lamp 72 lights or blinks, it is possible to improve the troubleshooting of the fuel injection system 61.

Figure 13:
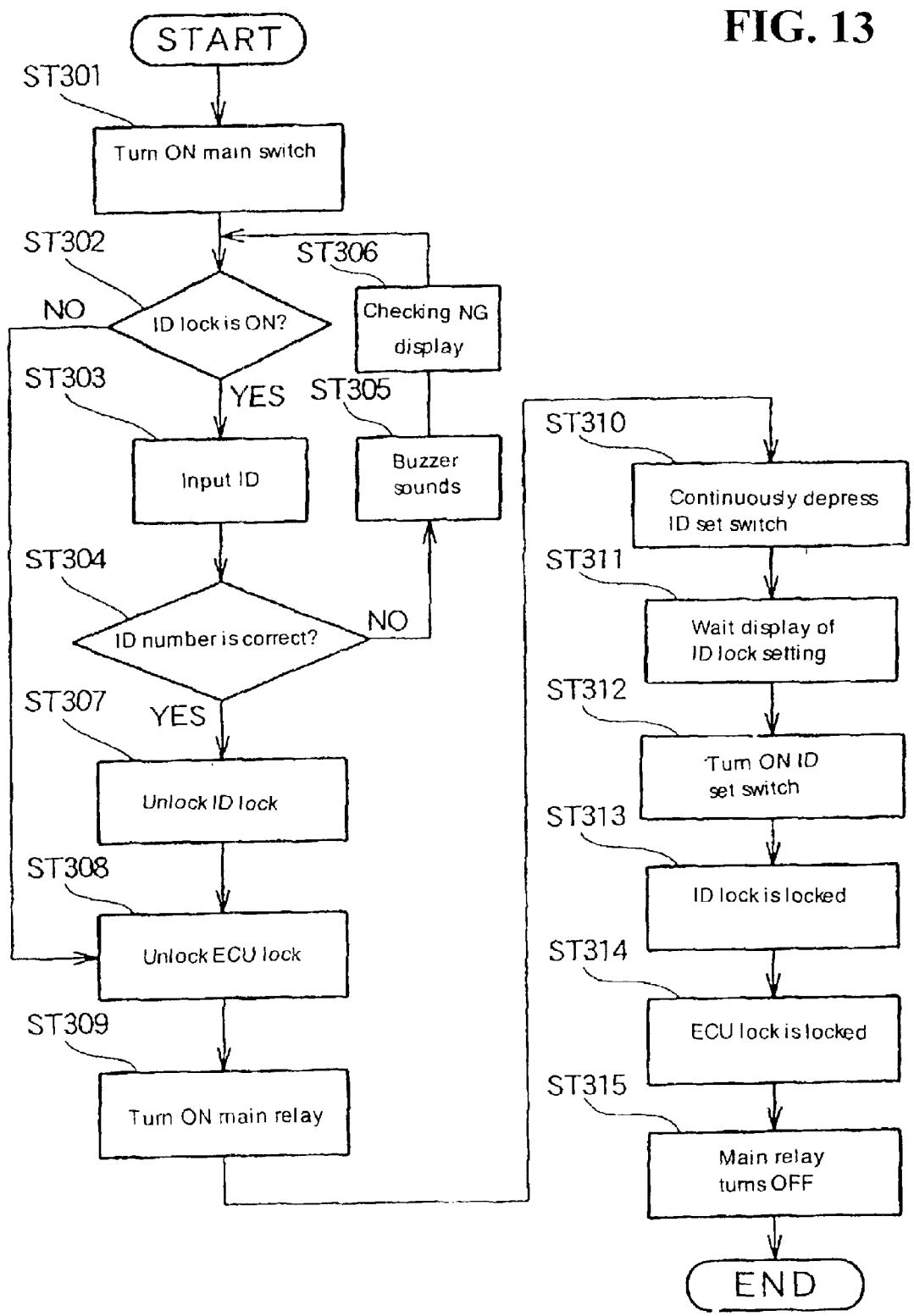
FIG. 13 is a flow chart showing procedures for locking/unlocking in the transportation means in which the method for releasing a secret number of a theft prevention function according to the present invention has been adopted.

FIG. 13 is a flow chart showing a locking/unlocking procedure for a theft prevention function for transportation means in which a method for releasing a secret number of a theft prevention function according to the present invention has been adopted (for reference numerals, refer to FIG. 7). In this respect, STxxx designates a step No.

ST301: Turn ON the main switch 45.

ST302: Judge whether or not the ID lock (theft prevention function) has been turned ON. If YES, the sequence will proceed to ST303, and if NO, to ST307.

ST303: Input the ID number through the use of the ID number switch 3d. An allowable number of times for input of this ID number has been set to three times at a maximum. That is, if a mistake is made three times, the power source for the display device 70 (See FIG. 4) will turn off.

ST304: Judge whether or not the ID number is correct. If YES, the sequence will proceed to ST306, and if NO, the sequence will return to ST302 through ST305 and ST306.

ST305: Sound a buzzer as a warning.

ST306: As a result of checking, display that the ID number is wrong (checking NG display). In other words, the ID mark 78h (See FIG. 5), the key mark 78i and the inputted number blink and display.

ST307: Unlock the ID lock.

ST308: Unlock the control unit (ECU) 101.

ST309: Turn ON the main relay 91. In this state, complete the start-up of the display device 70 (See FIG. 4). Hereinafter, an ID lock locking procedure will be shown.

ST310: Continuously depress the ID set switch 73c. In this case, a time period for continuously depressing is set to two or more seconds.

ST311: A setting-wait-display for the ID lock is displayed on the display device 70.

ST312: Press the ID set switch 73c.

ST313: The ID lock is locked.

ST314: The control unit (ECU) 101 is locked, and the display device 70 (See FIG. 4) becomes inoperable.

ST315: The main relay 91 turns OFF.

Figure 14A:
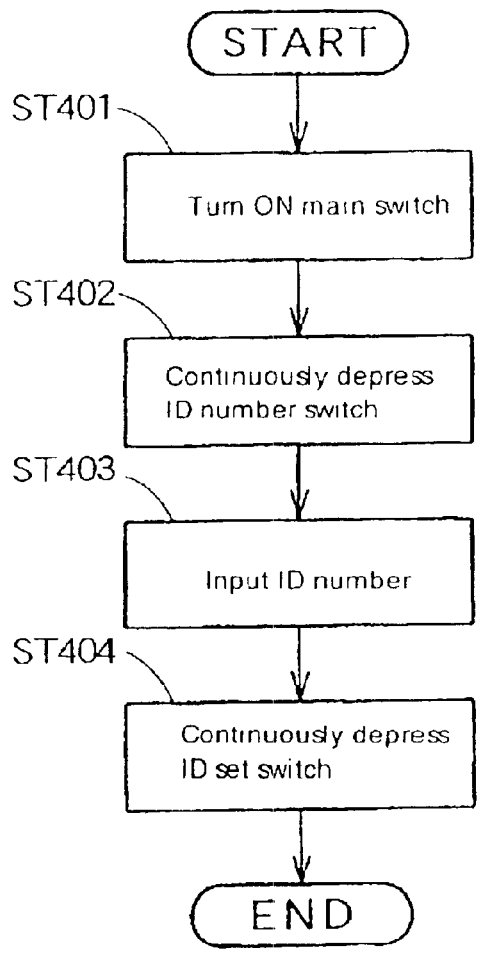
FIGS. 14(a) and 14(b) are flow charts showing procedures of new ID registration/ID forced release of the transportation means in which the method for releasing a secret number of a theft prevention function according to the present invention has been adopted.
Figure 14B:
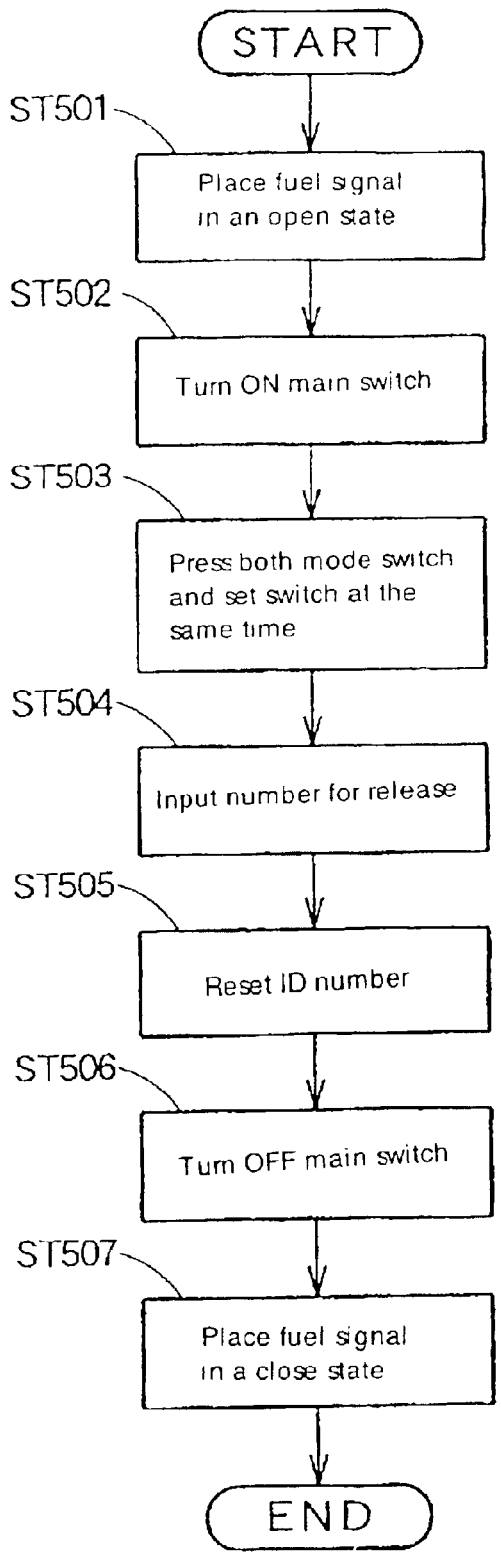

FIGS. 14(a) and 14(b) are flow charts (for reference numerals, refer to FIG. 5) showing procedures for new ID registration/ID forced release of the theft prevention function for transportation means in which a method for releasing a secret number of a theft prevention function according to the present invention has been adopted. In this respect, STxxx designates a step No.

FIG. 14(a) shows a procedure for new ID registration of the ID lock (theft prevention function).

ST401: Turn ON the main switch 45 (See FIG. 7).

ST402: Continuously depress the ID number switch 73d. In this case, the time period for continuously depressing is set to two or more seconds.

ST403: Input the ID number through the use of the ID number switch 73d.

ST404: By continuously depressing the ID set switch 73c, a new ID number can be registered. In this case, the time period for continuously depressing is set to two or more seconds.

Thereafter, this operation will be completed by way of the steps of ST309 to ST312 shown in FIG. 13.

FIG. 14(b) shows the procedure for ID forced release of the ID lock (theft prevention function).

ST501: A fuel signal is caused to be in an open state. That is, it is caused to be in a state in which a harness from a fuel sensor (not shown) of the fuel injection system 61 has been removed. For example, one of the harness 87a, 87b shown in, for example, FIG. 6 is removed.

ST502: Turn ON the main switch 45 (See FIG. 7).

ST503: Continuously depress both the set switch 73a and the mode switch 73b at the same time. In this case, the time period for continuously depressing is set to five seconds.

ST504: Input a number for release as a predetermined number through the use of the ID number switch 73d. In this case, the number for release is a predetermined number during manufacture of the boat hull, such as the boat hull number.

ST505: The ID number is reset. In this respect, when the ID number is reset to become the initial value "000", the ID lock cannot be locked any longer, but the ID number will be inputted again.

ST506: Turn OFF the main switch 45.

ST507: The fuel signal is caused to be in a close state. In other words, the harness removed will be returned to the original state.

That is, by the operations in ST501 to ST505, the ID number can be forcibly released to reset the ID number.

When newly using, start with new registration of the ID number again.

In transportation means equipped with a theft prevention function capable of turning ON the power source by the occupant inputting a secret number, a secret number release method for the theft prevention function in the transportation means (jet propulsion boat 10) is a method by which the secret number is rendered capable of being released by removing at least one of a plurality of connector 87a, 87b (See FIG. 6) connected to the theft prevention function, by inputting a predetermined number (number for release).

For example, if the operator or the owner has forgotten the secret number, the entire theft prevention function is typically replaced. Accordingly, the repair expenses will be enormously high. On the other hand, when the secret number can be simply reset, the theft prevention function cannot be maintained.

Thus, since the secret number is rendered capable of being released by removing at least one of a plurality of connector 87a, 87b (See FIG. 6) connected to the theft prevention function, by inputting a predetermined number, it is possible to make forgetting the secret number and maintenance of the theft prevention function compatible.

Figure 15:
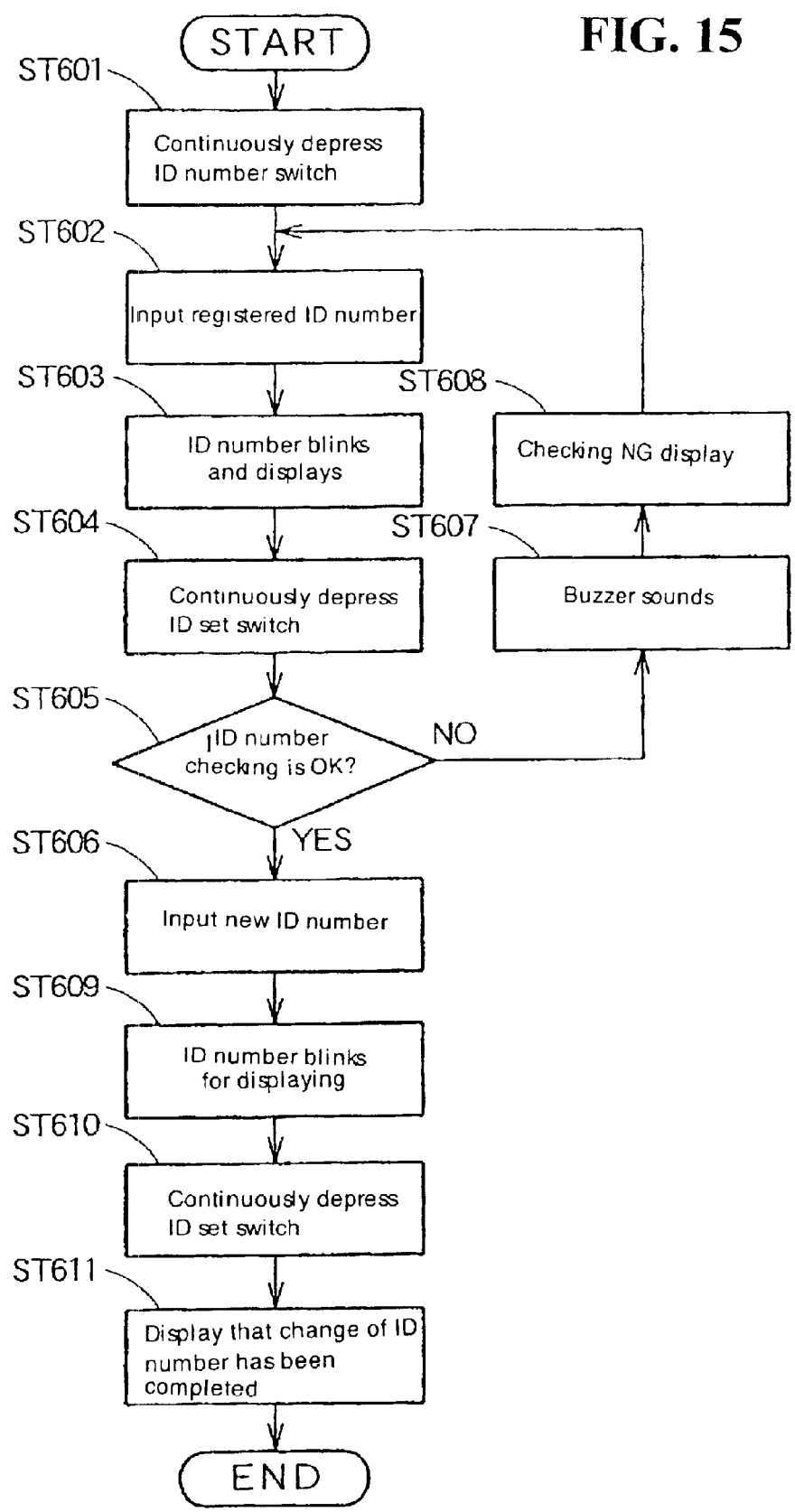
FIG. 15 is a flow chart showing a procedure of changing the registered ID number for theft prevention function of the transportation means in which the method for releasing a secret number of a theft prevention function according to the present invention has been adopted.

FIG. 15 is a flow chart (for reference numerals, refer to FIG. 5) showing a procedure for changing a registration ID number of the theft prevention function for transportation means in which a method for releasing a secret number of a theft prevention function according to the present invention has been adopted. In this respect, STxxx designates a step No.

ST601: Continuously depress the ID number switch 73d. In this case, a time period for continuously depressing is set to two or more seconds.

ST602: Input the registered ID number.

ST603: The inputted ID number blinks.

ST604: Continuously depress the number switch 73d. In this case, a time period for continuously depressing is set to two or more seconds.

ST605: Judge whether or not the ID number is correct. If YES, the sequence will proceed to ST506, and if NO, the sequence will return to ST602 through ST608. In this respect, an allowable number of times for input of this ID number has been set to three times at a maximum. That is, if a mistake is made three times, the power source for the display device 70 (See FIG. 4) will turn off.

ST606: Input the new ID number.

ST607: Sound the buzzer as a warning.

ST608: As a result of checking, display that the ID number is wrong (checking NG display). In other words, blink and display the ID mark 78h (See FIG. 5), the key mark 78i and the inputted number.

ST609: Blink the new ID number.

ST610: Continuously depress the ID set switch 73c. In this case, the time period for continuously depressing is set to two or more seconds.

ST611: By lighting the new ID number, display that the registration has been completed.

Figure 16:
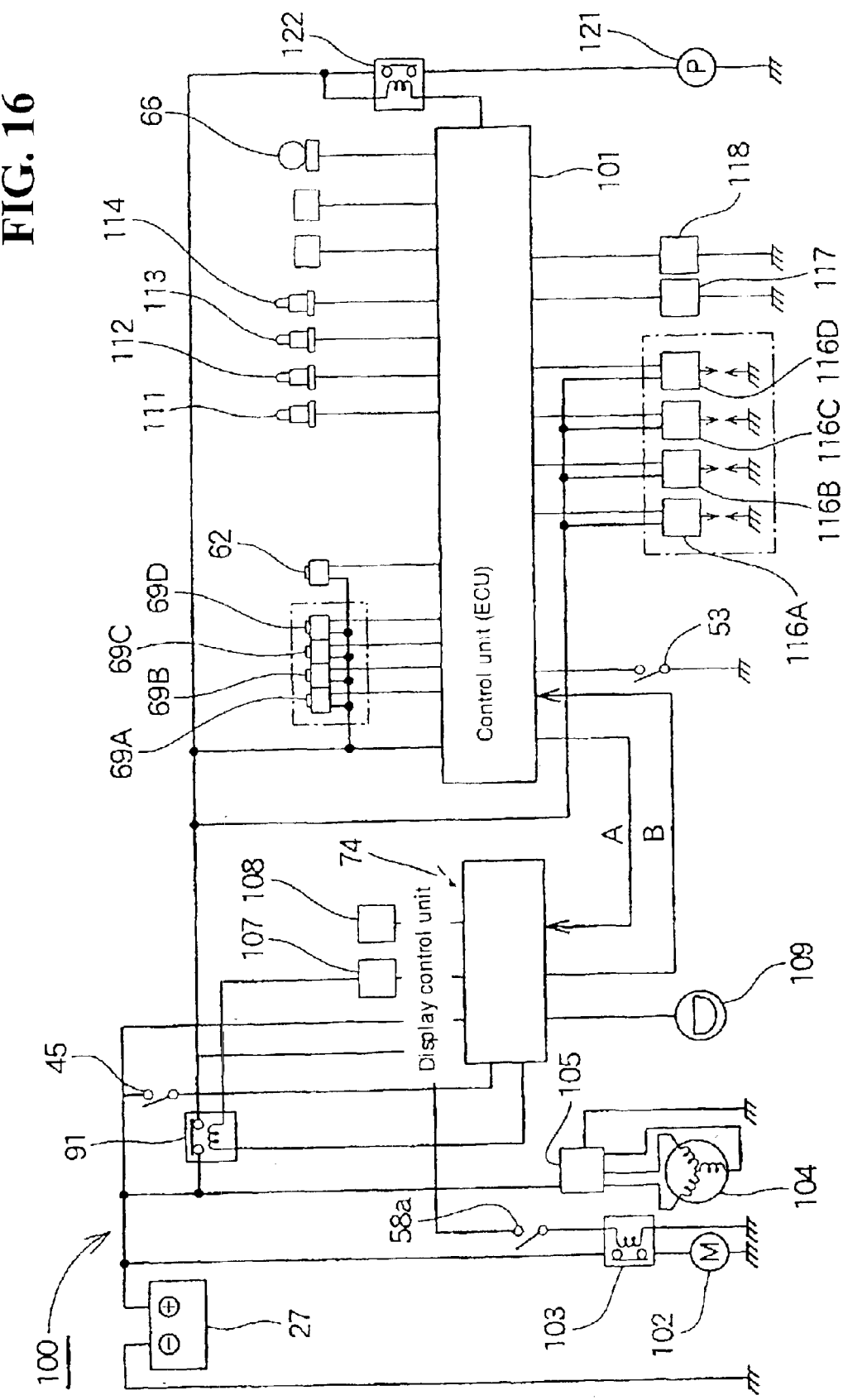
FIG. 16 is a view showing a control system for the transportation means in which the method for releasing a secret number of a theft prevention function according to the present invention has been adopted.

FIG. 16 is a view showing a control system for transportation means in which a method for releasing a secret number of a theft prevention function according to the present invention has been adopted.

The control system 100 for small boat is mainly composed of: a battery 27 which is a power source supply source; an injector 69 (displayed as "injector 69A to 69D") for the fuel injection system 61 (See FIG. 4); a main relay 91; a display control unit 74 mounted onto the display device 70 (See FIG. 5); and a control unit (ECU) 101 for controlling the engine 15 (See FIG. 1).

In FIG. 16, a reference numeral 102 designates a starter; reference numeral 103 is a starter relay for turning the starter 102 ON/OFF; reference numeral 104 is a generator; reference numeral 105 is a regulator for regulating voltage generated by the generator; reference numeral 107 is a buzzer connected to the display control unit 74; reference numeral 108 is a speed sensor connected to the display control unit 74; reference numeral 109 is a fuel sensor connected to the display control unit 74; reference numeral 111 is a temperature sensor connected to the control unit (ECU) 101; reference numeral 112 is a water temperature sensor connected to the control unit (ECU) 101; reference numeral 113 is an exhaust temperature detection sensor connected to the control unit (ECU) 101; reference numeral 114 is an oil temperature sensor connected to the control unit (ECU) 101 for detecting temperature of the engine oil; reference numerals 116A to 116D are ignition system members (ignition plug and ignition coil); reference numeral 117 is an oil pressure sensor; reference numeral 118 is a knock sensor for detecting knocking in the engine 15; reference numeral 121 is a fuel pump; and reference numeral 122 is a relay for turning the fuel pump ON/OFF.

A flow indicated by an arrow A shows engine oil information, temperature information, fuel information, engine number of revolutions information, warning lamp information and OTS (Off Throttle Steering System) information that are sent from the control unit (ECU) 101 to the display control unit 74.

Also, a flow indicated by an arrow B shows lock information and limited operation information that are sent from the display control unit 74 to the control unit (ECU) 10.

In the present invention, a description has been made such that one of the harnesses 87a, 87b shown in, for example, FIG. 6 is removed as shown in FIG. 14. However, the present invention is not limited thereto, but a fuel signal or the like can be caused to be in an open state, and it may be possible to for example, remove the connector to cause it to be in an open state.

The present invention exhibits the following effect due to the above-described structure.

If an operator or owner has forgotten the secret number, the entire theft prevention function may have to be replaced. Accordingly, the repair expenses will be enormously high. On the other hand, when the secret number can be simply reset, the theft prevention function cannot be maintained.

According to the first aspect of the present invention, since the secret number is rendered capable of being released by removing at least one of a plurality of harnesses connected to the theft prevention function, and by inputting a predetermined number, it is possible to make forgetting the secret number and maintenance of the theft prevention function compatible.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for releasing a secret number of a theft prevention function in a transportation means, the transportation means being equipped with a theft prevention function capable of turning a power source ON by an occupant inputting the secret number, said method comprising the steps of:

removing at least one of a plurality of harnesses connected to said theft prevention function; and inputting, with said at least one harness removed, a predetermined number, wherein said secret number is rendered capable of being released.

2. The method for releasing a secret number of a theft prevention function in a transportation means according to claim 1, wherein said step of removing includes the step of removing a harness from a fuel sensor of a fuel injection system of the transportation means.

3. The method for releasing a secret number of a theft prevention function in a transportation means according to claim 2, further comprising the steps of:
- turning on a main switch of a power source system of the transportation means; and
- simultaneously depressing a set switch and a mode switch of an operation switch of the transportation means for a predetermined period of time.

4. The method for releasing a secret number of a theft prevention function in a transportation means according to claim 3, wherein said step of inputting includes the step of inputting through the use of an ID number switch of the operation switch of the transportation means.

5. The method for releasing a secret number of a theft prevention function in a transportation means according to claim 2, wherein said step of inputting includes the step of inputting through the use of an ID number switch of an operation switch of the transportation means.

6. The method for releasing a secret number of a theft prevention function in a transportation means according to claim 1, further comprising the steps of:
- turning on a main switch of a power source system of the transportation means; and
- simultaneously depressing a set switch and a mode switch of an operation switch of the transportation means for a predetermined period of time.

7. The method for releasing a secret number of a theft prevention function in a transportation means according to claim 6, wherein said step of inputting includes the step of inputting through the use of an ID number switch of the operation switch of the transportation means.

8. The method for releasing a secret number of a theft prevention function in a transportation means according to claim 1, wherein said step of inputting includes the step of inputting through the use of an ID number switch of an operation switch of the transportation means.

9. A device for releasing a secret number of a theft prevention function in a transportation means, the transportation means being equipped with a theft prevention function capable of turning a power source ON by an occupant inputting the secret number, said device comprising:
- a plurality of harnesses connected to said theft prevention function, at least one of said plurality of harnesses being removable; and
- means for inputting, with at least one of said harnesses removed, a predetermined number, wherein said secret number is rendered capable of being released.

10. The device for releasing a secret number of a theft prevention function in a transportation means according to claim 9, wherein said at least one harness is a harness from a fuel sensor of a fuel injection system of the transportation means.

11. The device for releasing a secret number of a theft prevention function in a transportation means according to claim 10, further comprising:
- a main switch of a power source system of the transportation means; and
- a set switch and a mode switch of an operation switch of the transportation means,
- wherein releasing the secret number includes turning the main switch on and simultaneously depressing the set switch and the mode switch for a predetermined period of time.

12. The device for releasing a secret number of a theft prevention function in a transportation means according to claim 11, further comprising an ID number switch of the operation switch of the transportation means for inputting the predetermined number.

13. The device for releasing a secret number of a theft prevention function in a transportation means according to claim 10, further comprising an ID number switch of an operation switch of the transportation means for inputting the predetermined number.

14. The device for releasing a secret number of a theft prevention function in a transportation means according to claim 9, further comprising:
- a main switch of a power source system of the transportation means; and
- a set switch and a mode switch of an operation switch of the transportation means,
- wherein releasing the secret number includes turning the main switch on and simultaneously depressing the set switch and the mode switch for a predetermined period of time.

15. The device for releasing a secret number of a theft prevention function in a transportation means according to claim 14, further comprising an ID number switch of the operation switch of the transportation means for inputting the predetermined number.

16. The device for releasing a secret number of a theft prevention function in a transportation means according to claim 9, further comprising an ID number switch of an operation switch of the transportation means for inputting the predetermined number.

* * * * *